Figure 1:
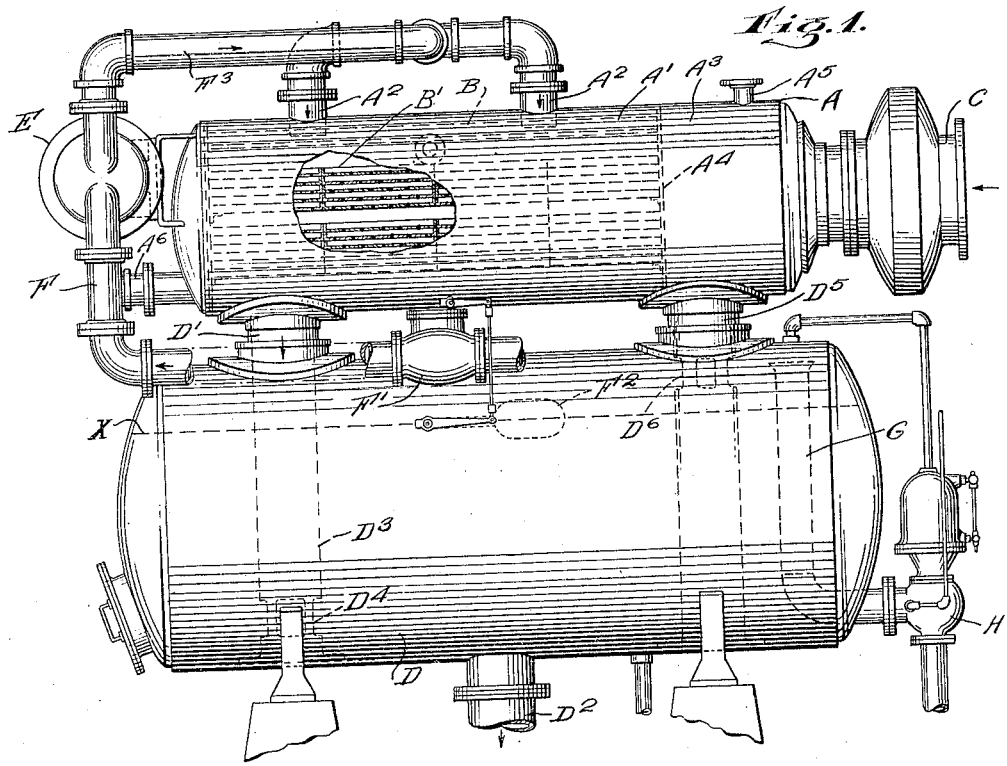

June 13, 1933. V. A. ROHLIN 1,914,166
APPARATUS FOR TREATING LIQUIDS
Filed March 21, 1931

INVENTOR.
VICTOR A. ROHLIN
BY John E. Hubbell
ATTORNEY

Patented June 13, 1933

1,914,166

UNITED STATES PATENT OFFICE

VICTOR A. ROHLIN, OF PHILADELPHIA, PENNSYLVANIA, ASSIGNOR TO COCHRANE CORPORATION, OF PHILADELPHIA, PENNSYLVANIA, A CORPORATION OF PENNSYLVANIA

APPARATUS FOR TREATING LIQUIDS

Application filed March 21, 1931. Serial No. 524,406.

My present invention relates in general to apparatus for heating and degasifying liquids and particularly to apparatus of this character used for heating and deaerating water intended to be supplied as feed water to steam generating apparatus.

In one type of such apparatus, the water is heated and deaerated by bringing it into intimate contact with flowing steam in a closed chamber. The water to be treated is passed through the chamber in a finely divided form and the steam coming into contact therewith heats the water to or substantially to the temperature of the steam, whereby air and other undesirable gases entrained in the water are separated therefrom. Those skilled in this art understand that while oxygen and other permanent gases are soluble in water at all temperatures below boiling point, at the boiling point corresponding to any given pressure to which the water may be subjected, the solubility becomes zero, and on agitation of the water, the gases readily separate therefrom. The uncondensed portion of the heating and deaerating steam and the air and other gases liberated from the water are vented from the chamber. The heated and deaerated water is then usually passed into a storage tank adjacent the deaerating heater and withdrawn therefrom as required by pumping apparatus associated with the apparatus in which the heated and deaerated water is used.

Apparatus of the character heretofore described has gone into excessive commercial use and in normal operation produces oxygen-free water at a temperature within one or two degrees of the temperature of the entering steam, as long as the supply of heating and deaerating steam to the chamber is sufficient. The source of supply of steam is usually the exhaust from turbines and auxiliary apparatus associated with the steam generator. Whenever the exhaust steam supply is in excess of heating requirements, the excess portion can be diverted into the plant heating system or to other uses; since if passed to the deaerating chamber, it can perform no useful function and merely increases the load on the chamber venting apparatus. If, however, the steam supply should suddenly fail while the water continues to be supplied, the water passing through the chamber during this interval will only be slightly heated and the undesirable gases will be retained therein. On passing to the storage tank in the usual manner, it will rapidly contaminate and lower the temperature of the water present therein.

The object of my present invention is the provision of an improved construction and arrangement of liquid heating and/or deaerating and storing apparatus, characterized that on a sudden drop in or cessation of the steam supply to the heating and deaerating apparatus, steam will be generated in the storage apparatus and passed into the heating and deaerating chamber in sufficient quantities to maintain the operating efficiency substantially normal under such conditions for a limited period.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described a preferred embodiment of the invention.

Figure 2:
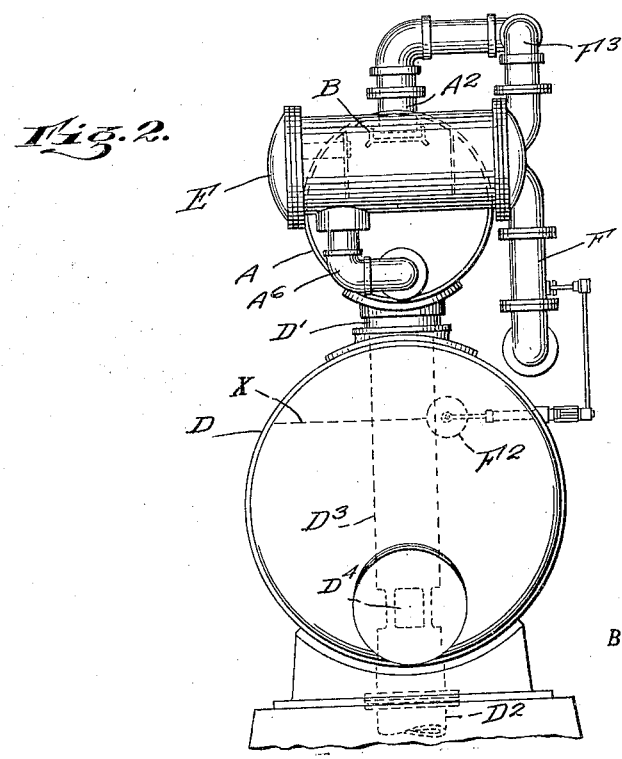

Of the drawing:

Fig. 1 is an elevation of a water deaerating heater and storage tank constructed and arranged in accordance with my present invention, portions of the heater and tank being broken away to show the internal construction thereof; and Fig. 2 is an end view of the apparatus shown in Fig. 1.

In the particular embodiment of the present invention illustrated, water is heated and deaerated in a section or chamber A', shown extending throughout a major portion of a horizontally elongated cylindrical deaerating heater shell A. The shell is provided with one or more water inlet pipes $A^2$ spaced along the top of the shell and having their lower ends submerged in a distributing trough or box B extending longitudinally of the chamber A' and over the edges of which the water flows onto the upper end of tray stacks B' arranged longitudinally throughout the chamber A'. Steam is supplied from a suitable source to the shell A through a steam inlet pipe C at least of sufficient size to deliver a flow of steam corresponding to the maximum capacity of the heater. The steam passes from the pipe C into an inlet chamber $A^3$ formed in the remaining portion of the shell A and separated from the chamber A' by a partition $A^4$, which is formed with suitable openings or cut away at a point above the normal water line in the chamber A', to permit the passage of steam from the chamber $A^3$ to the chamber A'. A suitable pressure relief valve $A^5$ is installed in the shell portion forming the chamber $A^3$.

The steam thus supplied to the heating and deaerating chamber comes into intimate contact with the water passing downwardly in finely divided streams through the tray stacks and when supplied in sufficient quantity, will heat the water to approximately the temperature of the steam and cause air and other undesirable gases in the water to be separated therefrom. The heated and deaerated water collects in the bottom of the chamber A' below the tray stacks and then passes into a storage section or chamber in communication with the chambers A' and $A^3$ and, in the installation shown, formed in a separate tank D of similar shape and substantially larger in volume than the shell A. Any uncondensed steam passes out of the heater with the gases separated from the water through a vent pipe $A^6$ connecting the end of the chamber A' opposite the steam inlet chamber to a vent condenser E, where a portion of the heat content of the vented mixture is recovered and utilized for pre-heating the water to be treated before it is delivered to the chamber A'.

The water to be treated is supplied through a water supply pipe F, the supply being regulated by a control valve F' therein responsive to and actuated by changes in level of the heated and deaerated water present in the storage tank. For this purpose, a control float $F^2$ is arranged in the tank adjacent the normal water level therein and operatively connected to the operating mechanism of the valve by the suitable arrangement of levers and links conventionally indicated. The flow of water to the heater thus increases and decreases as the level of the water in the storage tank decreases and increases, respectively. The water passing the valve F' flows through the vent condenser E, in which its temperature is increased and from which it is delivered to the chamber A' through a pipe $F^3$ and a pair of pipes $A^2$. The air and other uncondensed gases are discharged or drawn from the vent condenser, depending upon the pressure normally present in the shell A.

With the apparatus constructed and arranged as described, water heated and deaerated in the chamber A' passes from the bottom of the chamber A' into the storage section through a pipe D'. The heated and deaerated water will remain in the tank until withdrawn through the discharge pipe $D^2$ by a boiler feed pump or other means (not shown). The normal water level in the storage tank is indicated by the line X and the water contained therein will normally not measurably differ in temperature from that in the bottom of the chamber A'. The apparatus will continue to efficiently treat the water in the described manner as long as the supply of steam through the pipe C is sufficient to heat all of the water passing through the chamber A' to the desired temperature. If for any reason the steam supply substantially decreases or ceases, the water passing through the chamber A' will not be heated to the desired temperature nor will the undesirable gases contained therein be removed. If this condition is permitted to continue, the water in the storage tank will be rapidly contaminated and its temperature lowered by the undeaerated low temperature water delivered thereto and will result in the delivery of undeaerated water at a subnormal temperature to the boiler feed pump. A corresponding decrease in pressure will also occur in the chamber A' due to the absence of steam and presence of low temperature water.

In accordance with my present invention, the storage chamber or section is so constructed and arranged relative to the heater chambers A' and $A^3$ that the vapor pressure in the space above the water therein is normally the same as the steam pressure in the inlet chamber $A^3$. The chambers are so connected that on a sudden drop in pressure in the steam inlet passage to the heating and deaerating chamber A', the pressure in the storage chamber will drop correspondingly, and since the water in the storage chamber is normally at a temperature substantially equal to the normal steam temperature, the drop in pressure in the storage chamber will lower the boiling point of the water therein to a value below the existing temperature of the water. All of the heat contained in the water above the amount necessary to give the water a temperature corresponding to the new boiling point will be automatically and instantaneously utilized in vaporizing a portion of the water. By my hereinafter described construction and arrangement of the apparatus, the steam so formed passes into the heating and deaerating chamber in sufficient quantities to temporarily replace the normal supply of steam, and whereby the incoming water will be heated and deaerated in the usual manner.

In my improved construction, the pipe D' connecting the chambers A' and D is provided with a depending extension D³ which extends to a point adjacent the bottom of the storage chamber and is formed with a plurality of discharge openings D⁴ therein adjacent its lower end. These discharge openings will be always below the water level in the storage chamber with the contemplated conditions of operation for a limited period. With this sealed discharge connection between the chambers, any vapor generated in the upper portion of the storage chamber under the contemplated conditions of operation cannot flow up the pipe D'. The chambers A' and A³, as shown, are preferably arranged a short distance directly above the storage chamber and when so arranged the vapor space of the storage tank is directly connected to the portion of the steam supply connnection formed by the chamber A³ by a normally unobstructed equalizing connection formed by a pipe D⁵, which is provided with openings D⁶ to the vapor space of the storage chamber. The pipe D⁵ is of sufficient transverse cross sectional area to pass a flow of steam from the storage chamber corresponding to the amount of steam required to heat all of the water entering the chamber A' to the desired degree when the apparatus is being operated at its maximum capacity. The arrangement and size of the connection D⁵ is also such that this flow of steam will require only a small pressure head between the chambers, which need never exceed in amount the pressure difference corresponding to a water column of a height equal to the differences in level between the water in the bottom of the chamber A' and the water in the storage chamber. The connection D⁵ will therefore be sufficient to permit the required amount of steam to flow without causing water to back-up in the pipe D' into the chamber A'.

To prevent the water level in the storage chamber from rising to such an extent as to virtually eliminate the vapor space in the tank, I provide an overflow pipe G, the upper end of which while above the normal water level in the tank is advantageously located below the tops of the discharge openings D⁶ of the pressure equalizing connection. The lower end of the overflow pipe G is connected to a suitable discharge trap H which, for example, may well be of the type described and claimed in my prior joint application Serial No. 482,928, filed September 19, 1930, with F. M. Patterson, as co-inventor.

The operation of the described apparatus will be readily apparent. Normally, steam and water will be supplied to the chamber A' in the proper proportions to insure the desired water treatment, and the treated water delivered to the storage chamber. On a sudden drop in pressure in the chamber A³ due to a substantial reduction in or cessation of the steam supply, the vapor pressure in the storage chamber will drop, due to the pressure equalizing connection between the chambers. A portion of the stored water will be immediately vaporized and pass into the heating and deaerating chamber, where it will effect the desired treatment of the water supplied thereto. The water treated during this period will flow in the usual manner to the storage chamber. Water will be vaporized in the chamber D as long as the heat content of the stored water is more than sufficient to maintain the stored water at the boiling temperature corresponding to the vapor pressure to which it is subjected. Usually, the interruption or decrease in the normal steam supply will exist only for a short period and on a return to normal, the apparatus will be restored to its normal operating condition. If the interruption is due to a break in the steam supply connections or a similar cause, which would necessitate a substantial interruption interval in the steam supply, the water supply will be cut off by the operator. In any event, the described arrangement insures a continuation of the water treatment for a period sufficient to permit the change in steam supply to be noted and remedied by the operator. Advantageously, in the described construction, the stored water is always blanketed by steam unpolluted by air or other undesirable gases. While in a properly vented down-flow deaerating heater the vented mixture may pass in contact with the stored water without contaminating the water, it is always desirable to avoid contact of oxygen-containing gases with the tank and shell structures to minimize corrosion of the latter.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. Water treating apparatus comprising in combination, a heating section, means for supplying water to be heated thereto, a steam inlet connection to said section from a source of steam supply, a storage section having a vapor space and a water storage space and arranged to receive heated water from said heating section, and a normally unobstructed pressure equalizing connection between said storage section and said steam inlet connection proportioned for a flow of steam from said storage section to said steam inlet connection when the pressure in said inlet connection drops a predetermined amount and corresponding to the maximum steam flow capacity of said heating section.

2. Water treating apparatus comprising in combination, a heating and deaerating chamber, means for supplying water to be heated and deaerated thereto, a steam inlet connection to said chamber from a source of steam supply, a storage chamber having a vapor space and a water storage space and arranged to receive heated and deaerated water from said heating and deaerating chamber, and a normally unobstructed pressure equalizing connection between said storage chamber and said steam inlet connection proportioned for a flow of steam from said storage chamber to said steam inlet connection when the pressure in said inlet connection drops a predetermined amount and corresponding to the maximum steam flow capacity of said heating and deaerating chamber.

3. Water treating apparatus comprising in combination, a heating and deaerating chamber, means for supplying water to be heated and deaerated thereto, a steam inlet connection to said chamber from a source of steam supply, a storage chamber having a vapor space and a water storage space and arranged to receive heated and deaerated water from said heating and deaerating chamber by means of a water discharge pipe opening to said storage chamber adjacent the bottom thereof, and a normally unobstructed pressure equalizing connection between the vapor space of said storage chamber and said steam inlet connection proportioned for a flow of steam from said storage chamber to said heating and deaerating chamber when the pressure in said steam inlet connection drops a predetermined amount and corresponding to the maximum steam flow capacity of said heating and deaerating chamber.

4. Water treating apparatus comprising in combination, a heating and deaerating chamber, means for supplying water to be heated and deaerated thereto in regulable quantities, a steam inlet connection to said chamber from a source of steam supply comprising a steam inlet chamber arranged adjacent and opening to said heating and deaerating chamber, a storage chamber having a vapor space and a water storage space and arranged to receive heated and deaerated water from said heating and deaerating chamber by means of a water discharge pipe opening to said storage chamber adjacent the bottom thereof, and a normally unobstructed pressure equalizing connection between the vapor space of said storage chamber and said steam inlet chamber proportioned for a flow of steam from said storage chamber to said heating and deaerating chamber when the pressure in said steam inlet chamber drops a predetermined amount and corresponding to the maximum steam flow capacity of said heating and deaerating chamber.

5. Water treating apparatus comprising in combination, a shell including a heating and deaerating chamber, means for supplying water to be heated and deaerated to said chamber, a steam inlet connection to said chamber from a source of steam supply including a steam inlet chamber in said shell adjacent and opening to said heating and deaerating chamber, a tank directly below said shell and including a storage chamber having a vapor space and a water storage space, said tank being arranged to receive heated and deaerated water from said heating and deaerating chamber by means opening to said storage chamber adjacent the bottom thereof, and a normally unobstructed pressure equalizing connection between the vapor space of said storage chamber and said steam inlet chamber and proportioned for a substantial flow of steam from said storage chamber to said heating and deaerating chamber when the pressure in said steam inlet chamber drops a predetermined amount.

6. Water treating apparatus comprising in combination, a shell including a heating and deaerating chamber, means for supplying water to be heated and deaerated to said chamber, a steam inlet connection to said chamber in said shell adjacent and opening to said heating and deaerating chamber, a tank directly below and separate from said shell and including a storage chamber having a vapor space and a water storage space, said tank being arranged to receive heated and deaerated water from said heating and deaerating chamber by means of a water discharge pipe opening to said storage chamber adjacent the bottom thereof, and a second vertical pipe extending between said tank and shell and forming a normally unobstructed pressure equalizing connection between the vapor space of said storage chamber and said steam inlet chamber and proportioned for a substantial flow of steam from said storage chamber to said heating and deaerating chamber when the pressure in said steam inlet chamber drops a predetermined amount.

7. The method of treating water which consists in passing water to be treated in a finely divided form through a closed chamber, supplying steam to said chamber in sufficient quantities to heat the water to approximately the steam temperature, storing the treated water while at its high temperature in a chamber adjacent to the treating chamber, maintaining a vapor pressure on the water in the storage chamber the same as the pressure of the steam supplied to the treating chamber, and supplying steam generated in the storage chamber to the treating chamber on a drop in pressure of the steam normally supplied to the treating chamber, in sufficient quantities to maintain substantially normal water treatment conditions therein.

Signed at Philadelphia, in the county of Philadelphia and State of Pennsylvania, this 17th day of March A. D. 1931.

VICTOR A. ROHLIN.